United States Patent [19]

Wong

[11] Patent Number: 5,408,419
[45] Date of Patent: Apr. 18, 1995

[54] CELLULAR RADIOTELEPHONE SYSTEM SIGNALLING PROTOCOL

[75] Inventor: Chi Wong, Kirkland, Canada

[73] Assignee: Telefonaktiebolaget L M Ericsson, Stockholm, Sweden

[21] Appl. No.: 868,194

[22] Filed: Apr. 14, 1992

[51] Int. Cl.⁶ .......................................... G06K 13/00
[52] U.S. Cl. .................................... 364/514; 455/89; 455/33.1
[58] Field of Search ................ 364/514, 200, 514; 379/59, 60, 171, 185, 204, 207; 455/31.1, 33.2, 33.4, 38.1, 16, 89; 370/60

[56] References Cited

U.S. PATENT DOCUMENTS

| | | | |
|---|---|---|---|
| 4,119,800 | 10/1978 | Girardi | 179/2 |
| 4,144,409 | 3/1979 | Utano et al. | 179/2 |
| 4,519,068 | 5/1985 | Kreb et al. | 370/82 |
| 4,549,308 | 10/1985 | LoPinto | 455/26 |
| 4,555,805 | 11/1985 | Talbot | 455/26 |
| 4,574,163 | 3/1986 | Zato | 179/2 |
| 4,575,582 | 3/1986 | Makino | 179/2 |
| 4,646,345 | 2/1987 | Zdunek et al. | 379/62 |
| 4,658,416 | 4/1987 | Tanaka | 379/57 |
| 4,737,978 | 4/1988 | Burke et al. | |
| 4,748,681 | 5/1988 | Schmidt | 455/33 |
| 4,754,453 | 6/1988 | Eizenhofer | 370/95 |
| 4,775,999 | 10/1988 | Williams | 379/59 |
| 4,788,637 | 11/1988 | Tamaru | 364/200 |
| 4,811,377 | 3/1989 | Krolopp et al. | 379/62 |
| 4,835,731 | 5/1989 | Nazarenko et al. | 379/63 |
| 4,872,204 | 10/1989 | Hammer et al. | 455/54 |
| 4,876,740 | 10/1989 | Levine et al. | 455/33 |
| 4,878,238 | 10/1989 | Rash et al. | 379/62 |
| 4,905,272 | 2/1990 | Van de Mortel et al. | 379/62 |
| 4,922,486 | 5/1990 | Lidinsky et al. | 370/60 |
| 5,134,709 | 7/1992 | Bi et al. | 455/33.1 |
| 5,168,575 | 12/1992 | Cizek et al. | 379/59 |
| 5,170,485 | 12/1992 | Levine et al. | 455/33.2 |
| 5,257,369 | 10/1993 | Skeen et al. | 395/650 |

FOREIGN PATENT DOCUMENTS 2193861 2/1988 United Kingdom .

Primary Examiner—Ellis B. Ramirez
Assistant Examiner—Thomas Peeso
Attorney, Agent, or Firm—Johnson & Wortley

[57] ABSTRACT

A communications protocol for a cellular network comprised of a plurality of exchanges each of which includes a software package for providing services to a plurality of subscribers. According to this protocol, efficient communication between two exchanges can be implemented through a handshake procedure in which each exchange identifies the capabilities and features of its software package to the other exchange.

30 Claims, 4 Drawing Sheets

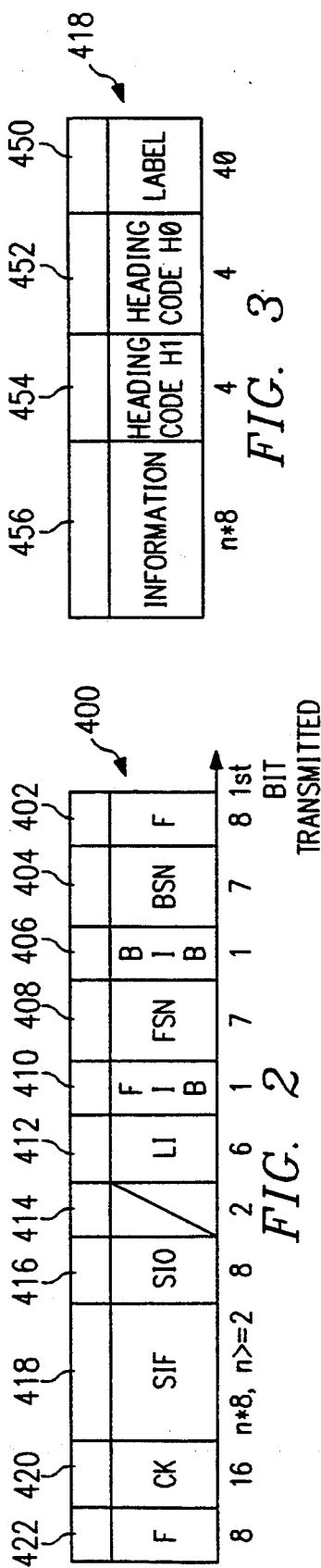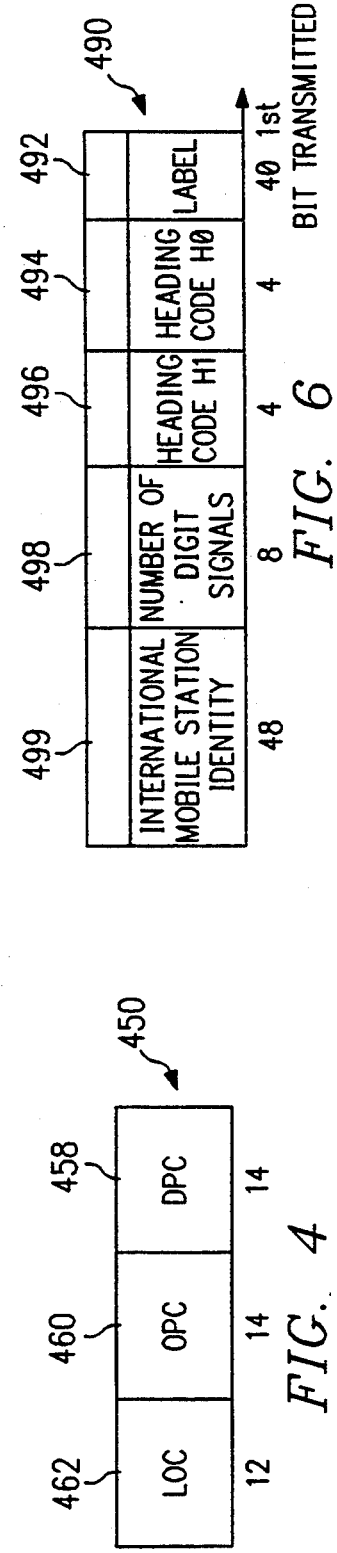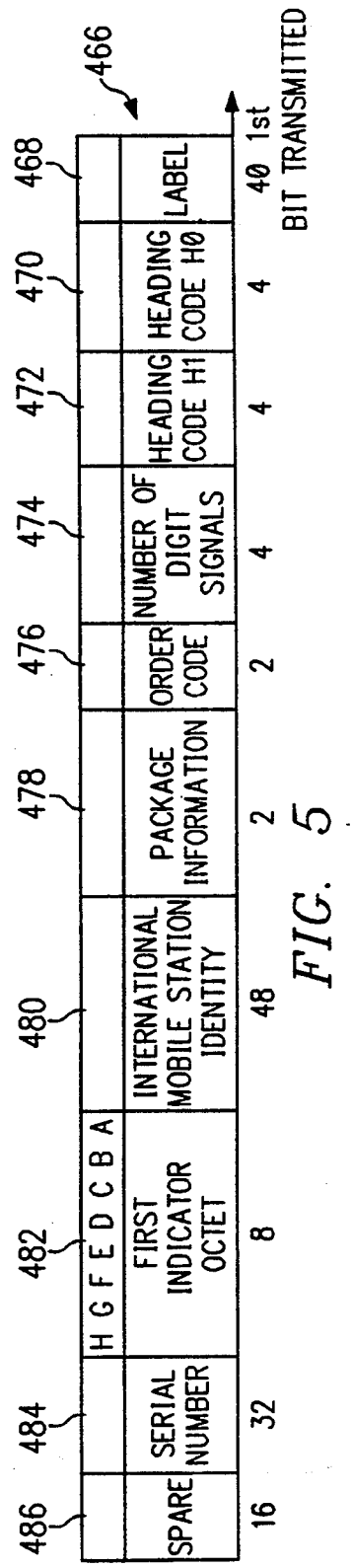

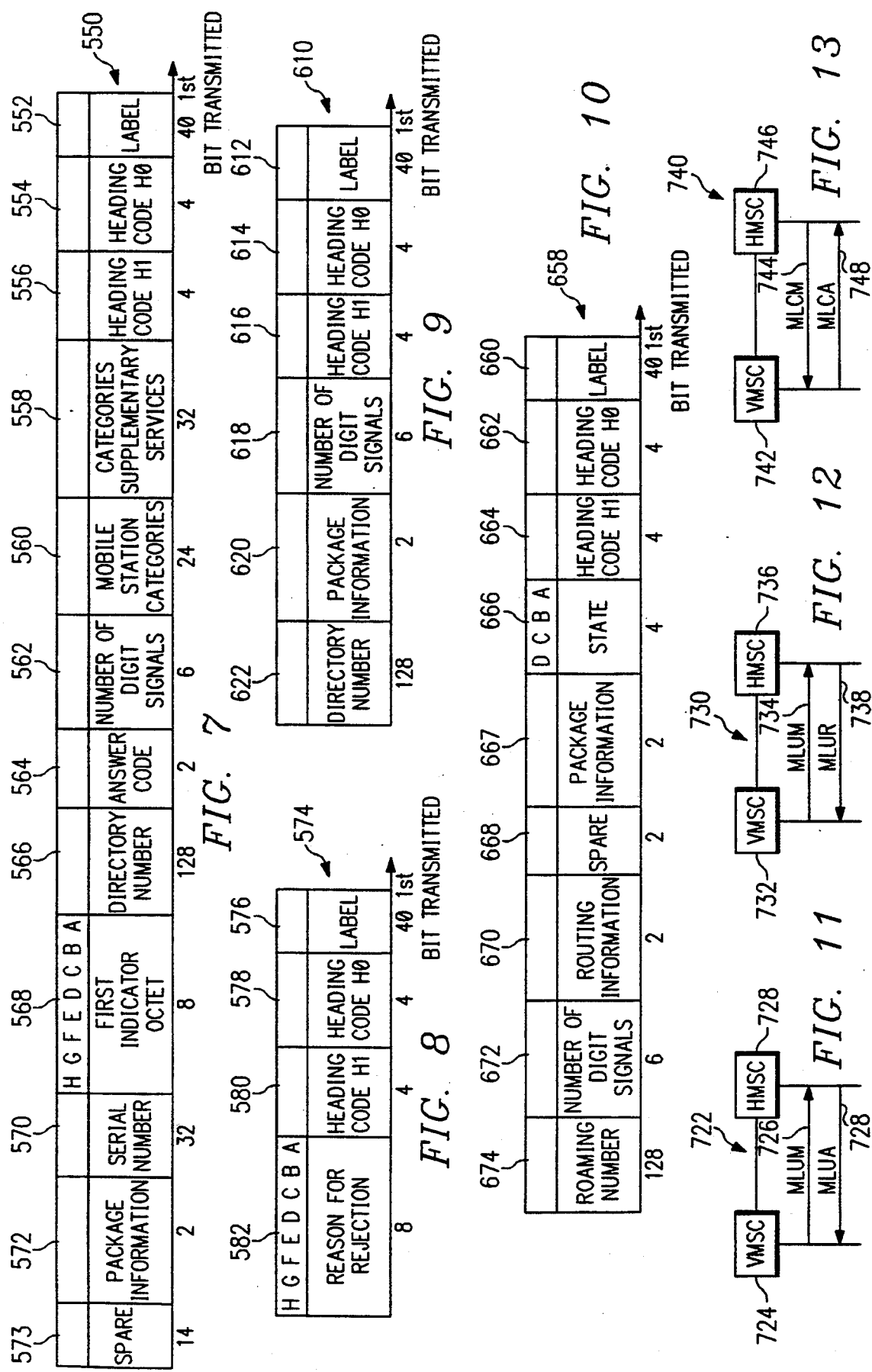

CELLULAR RADIOTELEPHONE SYSTEM SIGNALLING PROTOCOL

BACKGROUND OF THE INVENTION

1. Field of the Invention

The present invention relates to mobile radio telephone systems and, more particularly, to a signalling within a cellular radiotelephone system.

2. History of the Prior Art

Originally, mobile radiotelephone service was characterized by a central site radio transmitting with high power to a limited number of mobile units in a large geographic area. More recently, cellular radiotelephone systems have divided the coverage area into contiguous smaller coverage areas (cells) served by a plurality of base stations using low power transmitters and receivers controlled by an exchange located at a central site.

A cellular system typically utilizes one radio control channel in each cell to receive requests for service from mobile subscriber units, to call mobile subscriber units and to instruct mobile subscriber units to tune to a frequency pair where a conversation may take place. The control channel in each cell is assigned the task of continuously receiving and transmitting data and is the channel to which the mobile subscriber unit tunes when not in a conversational state.

Generally speaking, each cellular system is controlled by one or more mobile telephone switching offices ("MTSO's") which handles the calls to mobile stations located within a specified geographic area. Each mobile station is assigned to a particular MTSO or "home exchange" where it is registered for service. If the mobile leaves its home exchange and enters the territory of another exchange it is said to be "roaming". Needless to say, different cellular exchanges must cooperate and communicate with one another in order for a mobile to have continuous communication as it moves from one exchange to another or for a call originating in one exchange to be completed to a mobile located in another.

To communicate between MTSO's, a common signalling protocol must be used so both exchanges communicate in the same language. That language is a series of sequentially transmitted digital bits which are grouped together in fields to define the various functions needed to set up calls, hand-off a call from one cell to another, terminate a call, etc. Such signalling protocols have been standardized to some extent so that any cellular exchange can communicate with any other exchange to enable basic communications functions. These standards have necessarily come about due to the proliferation of companies involved in mobile telephone service. For example, the so-called CCITT No. 7 signalling system is used to interface different mobile telephone exchanges for roaming and handoff purposes. This signalling system may be identified by any one of three separate CCITT standards, commonly known as the Yellow book, the Red book, and the Blue book, or the ANSI (American National Standards Institute) standards. These different signalling standards are for use in communicating between the different exchanges comprising a cellular system network.

Pursuant to one of these four signalling systems, there is employed a digital bit stream known as message signal units which comprise the Mobile Telephone User Part ("MTUP") used in signaling between MTSO's such as that employed during automatic roaming signalling within the Yellow book standard used in North America. Within such message signal units a particular field is identified as the signalling information field. That field is composed of a stream of digital bits which can be employed to identify a particular function. All data specified within this field is selectively defined by the cellular system operator. Therefore, from the user point of view this field is common regardless of which signalling system is used in sending the data.

Adjacent MTSO's must communicate with each other in order to coordinate their services. For example, when a mobile subscriber roams from one MTSO to another, the automatic roaming function contained within certain software utilizes the CCITT No. 7 signalling protocol. This signalling protocol is the vehicle that transfers the necessary data in order to implement continuous communications to a mobile as it moves from one cellular exchange to another.

One instance in which cooperative signalling between MTSO's is required is to process a subscriber service call which is a request from a mobile unit to change one or more of the features available to the subscriber. If such a request is made in a visited MTSO and the mobile has not yet registered there, the visited MTSO informs the home MTSO of the new location of the mobile in the process of executing the selected subscriber service. The selected subscriber service information is also sent to the home MTSO through the signalling system.

Because MTSO's manufactured by different suppliers frequently make up a cellular system network, it is often the case that these MTSO's have different service capabilities. Further, adjacent systems owned by the same operators may each use a MTSO manufactured by the same supplier but which still have different capabilities. The capability of an MTSO is largely defined by the specific software "package" installed within it. When a MTSO makes a request for a specific service that is not provided by another MTSO due to the absence of this service from the capabilities of its software, that request is simply ignored. This results in a waste of resources for both of the MTSO's as well as the signalling system over which the request was sent. This waste can be avoided by permitting the two MTSO's to inform each other of their respective capabilities during the initial procedures required to effect a functional interaction between MTSO's.

In current cellular system networks, the automatic roaming function transfers operational information between two MTSO's during their initial handshake procedure. Specifically, the initial handshake and related signalling between a visited MTSO and a home MTSO involves a location updating message. The content of this message includes the current location of the mobile for the home MTSO and subscriber service package information for the visited MTSO. That is, if the home MTSO determines the new location to be valid, a location updating accepted message is returned to the visited MTSO to acknowledge the new location and to specify the subscriber services information for it.

Operators may specify and purchase from manufacturers of MTSO equipment different software packages to be furnished in different MTSO's in order to customize the system to the particular regional needs of that operator. Some MTSO's may provide services not offered by others. By including a software package designation as part of the data contained within the signalling information field, an MTSO would be able to determine whether the receiving MTSO is capable of handling future requests prior to sending the request. If the capability is not present, the MTSO can then make an intelligent alternative choice on a different course of action in handling the call. Such an ability to recognize the functional capability of MTSO's would avoid loading the MTSO processors with unnecessary requests that terminate unsuccessfully and also avoid needlessly occupying signalling resources on the data links between MTSO's. This capability is particularly useful to an MTSO running a software package which includes more functional capabilities than others. The present invention implements this capability and serves as a protocol for the bit stream used for signalling between different exchanges in a cellular network and particularly for the allocation of bits for identification of different software packages supported within different exchanges.

SUMMARY OF THE INVENTION

Accordingly, it is an object of the present invention to enable the efficient transmissions of data to and from cellular telephone exchanges and to provide a signal for identifying a particular software package used by the exchanges.

In one aspect, the system of the present invention includes a signalling system for communicating messages via a communications medium between a first location and a second location in a data communications system. The signalling system includes a variable length message which is transmitted between an originating station and received by at least one destination station and is composed of a label field containing the identification of the originating station and a destination station, a pair of heading code fields, and an information field which includes a package information block which identifies the particular software package within the originating station transmitting the variable length message. In a further aspect of the present invention both the originating station and the destination station are mobile switching centers within a cellular radio telecommunications network and the messages relate to the cellular radio service of a subscriber.

In another aspect, the system of the invention relates to a cellular radiotelephone system network carrying high speed digital messages between a plurality of mobile switching centers serving mobile subscribers located in different geographic areas within the network. In this system a first mobile switching center includes a software package having a particular identity which provides to the center certain specific features and communications capabilities. A second mobile switching center is connected to the first center for the communication of data therebetween and also includes a software package having a particular identity which provides to the second center certain specific features and communications capabilities. A signalling system carries digital data messages between the first and second mobile switching centers related to the providing of mobile communications services to the subscribers. The signalling system incorporates a communications protocol including a data packet label comprising an identification of a source switching center and a destination switching center, an information block including a message being sent from the source center to the destination center, and a means for identifying the particular software package within the source center from which the message originates.

In a still further aspect, the present invention includes a protocol for a data network including a data packet label comprising an identification of a source and a destination, an information block including a message being sent from the source to the destination, and a means for identifying the particular software package within the source from which the message originates. In one embodiment, the software package identification means is included within the information block. In another, the data network is part of a cellular radio telecommunications network and the message includes data being sent from one mobile switching center to another within the cellular network related to the cellular radio service of a subscriber. In still another the message is part of a handshaking procedure between two mobile switching centers preparatory to the exchange of additional messages therebetween.

In yet another aspect, the present invention includes a method of transmitting data packets in a data network which includes inserting into each packet a label containing an identification of the source and the destination of the packet, inserting an information block into the packet containing a message being sent from the source to the destination, and identifying within the packet the particular software package within the source from which the message originates.

BRIEF DESCRIPTION OF THE DRAWINGS

FIG. 2 is a block diagram of the overall data format of the signalling protocol employed in communications between cellular telephone exchanges in accordance with one embodiment of the system of the present invention;

FIG. 3 is a block diagram of the data format included within a signal information field of the signalling protocol;

FIG. 4 is a block diagram of the data format included within a label message unit of the signalling protocol;

FIG. 5 is a block diagram of the data format included within a location updating message of the signalling protocol;

FIG. 6 is a block diagram of the data format included within a location cancellation message, activity message or inactivity message of the signalling protocol;

FIG. 7 is a block diagram of the data format included within a location updating accepted message of the signalling protocol;

FIG. 8 is a block diagram of the data format included within a location updating rejected message of the signalling protocol;

FIG. 9 is a block diagram of the data format included within a routing enquiry message of the signalling protocol;

FIG. 10 is a block diagram of the data format included within a routing message of the signalling protocol;

FIG. 11 is a block diagram of the signalling sequence within a cellular communications network for a location updating;

FIG. 12 is a block diagram of the signalling sequence in a cellular communications network for a location updating where the updating is rejected;

FIG. 13 is a block diagram of the signalling sequence in a cellular communications network for a location cancellation and acceptance thereof;

DETAILED DESCRIPTION OF THE DRAWINGS

Figure 1:
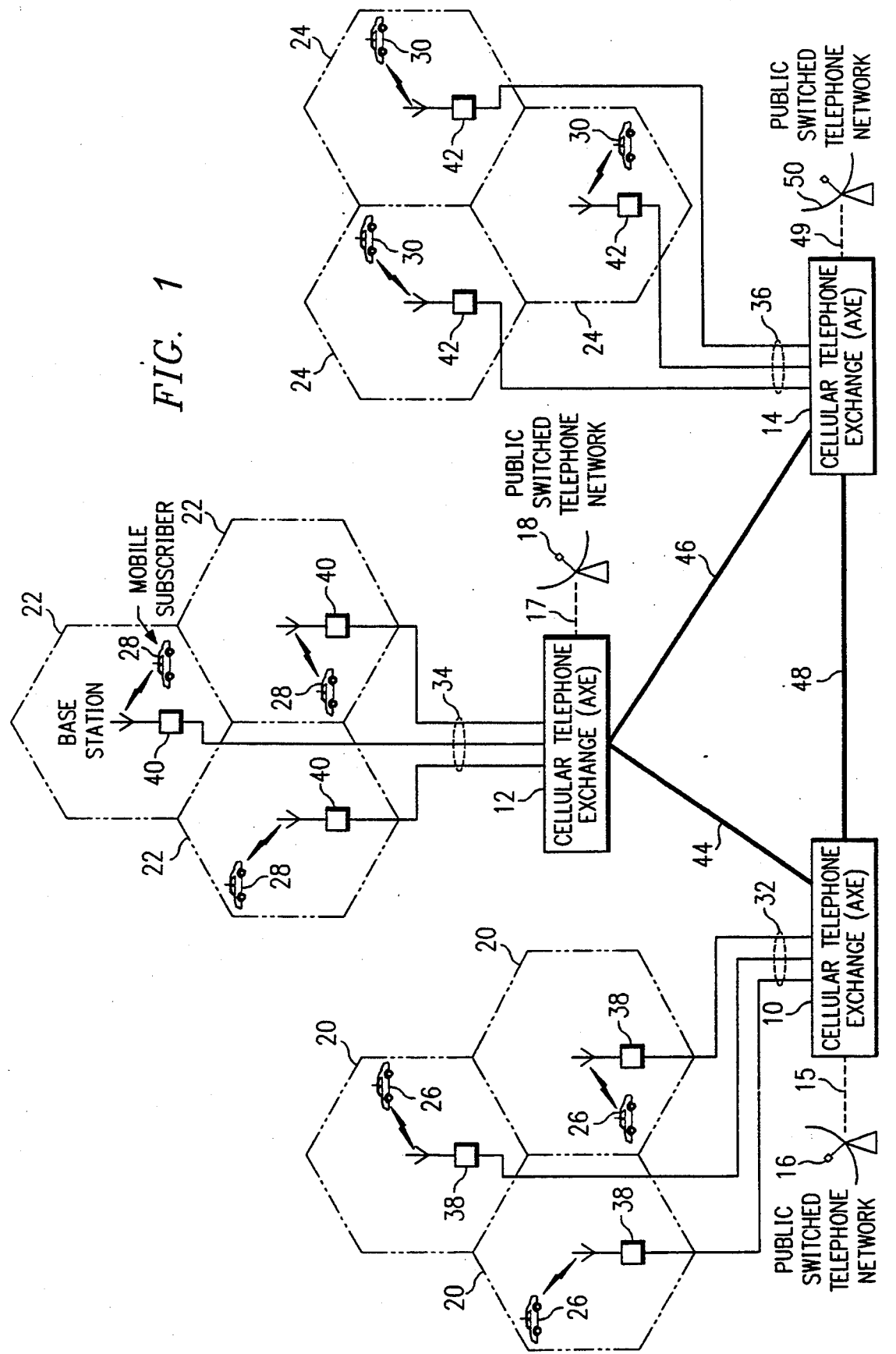
FIG. 1 is an illustrative diagram of three networked cellular telephone exchanges showing portions of their respective areas of coverage and illustrative mobile subscribers.

Referring first to FIG. 1, there is illustrated three networked cellular systems 10, 12 and 14 each connected by transmission lines 32, 34 and 36 to base stations 38, 40 and 42, respectively. Each base station is in radio communications with a plurality of mobile subscribers 26, 28 and 30 within the cells 20, 22 and 24 associated, respectively, with a particular base station. The cellular telephone exchanges 10, 12 and 14 are each individually connected to the public switched telephone networks 16, 18 and 50 by way of various transmission lines 15, 17 and 49, respectively. Each of the cellular telephone exchanges 10, 12 and 14 is also interconnected with data transmission lines 44, 46 and 48. The transmission lines 44, 46 and 48 provide a means of data communication between each of the exchanges in order to properly initiate calls, route calls from one exchange to the other, handoff calls from one exchange to the other and accomplish the other necessary intercommunications required between cellular exchanges. The communications between exchanges 10, 12 and 14 is achieved through digital signals structured according to certain formats. These formats are largely defined by the operator of the cellular telephone system and are constrained only by certain signalling conventions adhered to by the industry for purposes of standardization.

As shown in FIG. 1, the coverage area served by each of the cellular exchanges 10, 12 and 14 is comprised of the geographical area encompassed within the respective cells 20, 22 and 24 of each. Each of the cellular exchanges 10, 12 and 14 comprises a mobile telephone switching office ("MTSO") also known as a mobile switching center ("MSC") which administers both the cellular coverage area of the exchange as well as the mobile subscriber data associated with the mobile units 26, 28 and 30 and enables those units to move freely from cell to cell within their respective systems. However, one of the factors limiting the size of the coverage area of a cellular telephone exchange is the fact that each MSC can only handle a certain number of mobile stations. To provide additional geographic areas of coverage within a cellular network, a mobile station must rely on other MSC's located in other adjacent cellular exchange areas within the network. Thus, when a mobile station moves beyond the coverage area of its home exchange, the exchange with which it is normally associated and in which it is normally operating, another cooperating exchange may continue to offer it cellular service. From the point of view of the home exchange, a mobile which has left its home area is considered to be roaming and from the point of view of the cooperating exchange that mobile is considered to be visiting. In FIG. 1 for example, mobile stations 26 would be considered at home as long as they are located within the coverage area of the cells 20 of the exchange 10. If one of the mobile stations 26 travelled into the cellular coverage area 22 of the exchange 12 or into the coverage area of the cells 24 of the exchange 14 it would be considered to be roaming and a visitor within either of the two visited exchanges 12 or 14.

A cooperating cellular exchange can only offer cellular service to a roaming mobile station if it has access to the visiting mobile station's subscriber data. Some cellular system operators provide an automatic roaming feature which allows the automatic transfer of all of the necessary subscriber data to provide a roaming mobile station with cellular service within a cooperating exchange once the home exchange of that mobile station has recognized that the mobile has roamed. In order to be able to provide automatic roaming service, cooperating MSC's must communicate with one another in order to coordinate their services. Such communication would be allowed by means of the data links 44, 46 and 48 between the respective adjacent MSC's of cellular exchanges 10, 12 and 14. One of the standards which has been adopted within the cellular telecommunications industry is the so-called CCITT No. 7 signalling system which includes a signalling protocol made up of message signal units. One such illustrative message unit is shown in the block diagram of FIG. 2 and includes a signal information field which allows the user to transfer any necessary data from one MSC to another. The automatic roaming function implemented within cellular communication networks utilizes this protocol and, in particular, this field as a means to transfer the required subscriber service data from one MSC to another cooperating MSC and allow the implementation of automatic roaming service to mobile stations.

Although it will be discussed in greater detail below in connection with FIG. 2, the use of the signalling information field ("SIF") for the implementation of automatic roaming of mobile stations within the cooperating exchanges of a cellular communications network includes the transfer of messages necessary to allow the following exchange functions:

(1) roamer data updating;

(2) roamer C-number determination;
(3) subscriber service call for a roamer;
(4) location coordination at restart for roamers;
(5) call forwarding to roamers; and
(6) roaming routing interrogation.

Within the above-listed exchange functions, there are many messages which may be sent within the signalling protocol. Each of these are generally in the form of a data or action request by one MSC and a resulting reply by another. By way of example, the following messages are included:

(1) location updating—MLUM/MLUA;
(2) mobile station inactive—MINM/MINA;
(3) mobile station active—MACM/MACA;
(4) category updating—MCSU/MCSA;
(5) location cancellation—MLCM/MLCA;
(6) subscriber service call—MCCM/MCCA;
(7) C-number interrogation—MCIM/MCNM;
(8) location coordination at restart—MULM/MULA;
(9) call forwarding—MRIM/MRNM; and
(10) roamer routing interrogation—MREM/MROM.

Automatic roaming signalling is used between two MSC's within a cellular network when a mobile registers as a roamer within a visited MSC. Such a registration may take place as a result of any one of the following events:

(1) an autonomous registration in the visited MSC;
(2) a call from the mobile subscriber in the visited MSC; or
(3) a feature activation by the subscriber in the visited MSC.

Autonomous registration occurs periodically and is executed automatically by the mobile unit without any intervention on the part of the subscriber. The MSC covering the service area which receives an autonomous registration is able to determine the presence and location of the mobile as a result of the registration signal broadcast by the mobile. Upon reception of an autonomous registration by a visited MSC, a message is sent back to the home MSC of the registering mobile through the signalling system which informs the home MSC of the mobile's registration in the visited MSC and its current location. Such a message to the home MSC is necessary in order for it to direct any future calls which it receives for the mobile at its home telephone number to its current location within the visited exchange.

It is also possible for a mobile station to roam into the coverage area of a visited MSC and not be registered in the event the conditions necessary to trigger an autonomous registration event have not yet occurred. During this period, the initiating of an outgoing call by the mobile station also results in the visited MSC initially informing the home MSC of the mobile station's new location in the process of registration of the visiting mobile within the visited MSC. This information is sent to the home MSC by the visited MSC by means of the CCITT No. 7 signalling system via the data circuits interconnecting the respective MSC's.

The third way in which registration within a visited MSC can take place is by means of feature activation by a mobile subscriber within the visited MSC. A subscriber service call is a request from the mobile station to change one or more of the subscriber features available to it from the system. If such a request is made while the mobile station is located within a visited MSC and the mobile has not yet registered within that MSC as a roamer, the visited MSC initially informs the home MSC of the new location of the mobile prior to the execution of this requested subscriber service modification. This information is also sent from the visited MSC to the home MSC through the signalling system interconnecting the MSC's of the cellular network and by means of the signalling protocol in use within those circuits.

The switching and radio equipment comprising the exchanges which make up a cellular network may be supplied by a number of different manufacturers and may have many different capabilities as a result. In addition, adjacent cellular systems owned by different operators but using switching equipment supplied by the same manufacturer may also have different capabilities. The capability of particular exchanges may be determined in many instances by the specific software package installed within the exchange (and different releases thereof) which provide the various services within the exchange. When one exchange makes a request for a specific service that is not provided by another exchange the request is simply ignored by the receiving exchange and this results in a significant waste of resources in both the exchanges as well as the signalling system interconnecting them. Such wasted resources can be avoided by allowing two cooperating cellular exchanges which desire to communicate with each other to inform each other of their respective functional capabilities during the initial handshake procedure initiating the exchange of signalling messages between them.

In general, implementation of the automatic roaming function within a network includes an initial handshake procedure between two exchanges prior to the exchange of substantive and continuing information carrying messages. The initial handshake in the signalling interchange between a visited exchange and a home exchange involves a location updating message the content of which includes the current location of the mobile, i.e., within the visited exchange. When the home exchange determines the new location to be valid, a location updating accepted message is returned to the visited exchange to acknowledge the new location. This location updating message interchange which forms an integral part of the automatic roaming function is used in the system of the present invention to exchange software "package information" between the two MSC's. That is, when the visited exchange sends to the home exchange information related to the new location of the mobile station it also includes a block of data specifying the particular software package and/or version thereof which is running in the visited exchange. Similarly, when the home exchange receives and acknowledges the new location of its roaming mobile station, it also specifies in its location updating accepted message to the visited exchange a block of data identifying the software package and/or version thereof running in the home exchange. At this point, both MSC's are fully apprised of the respective software packages running in the other and as a result can both configure their own functions and message inquiries to what the other can accept as well as anticipate the inquiries and replies to messages from the other exchange. Such a capability greatly enhances the efficiency of communication between the respective MSC's and saves substantial data exchange and operational costs within and between each.

Another handshaking exchange of data between MSC's occurs during a routing inquiry from a gateway exchange to the home exchange of a mobile station. In such an exchange, the initial request message from the gateway exchange to the home exchange and the subsequent return message from the home exchange to the gateway exchange also include each a block of data identifying the respective software packages and/or versions thereof running in each of the two exchanges. This exchange of software package information by the exchanges similarly allows each of them an enhanced ability to deal with the other as a result of knowing what request messages and replies will be recognized and how it will be dealt with by the other.

A message exchange protocol incorporating the features of the present invention includes numerous benefits and advantages. For example, cellular system operators may choose a software package and/or version thereof with a specific set of functions in order to customize their services of their cellular system to the regional needs of their customers. However, such customization produces a cellular network of exchanges which is not uniformly the same and some exchanges may provide services which are not offered by others as a result of the differences between the software packages. By including the software package identification information as part of the data exchange between MSC's in the signalling information field an exchange is able to determine whether the receiver of its messages is capable of handling future requests prior to sending those requests. If an MSC knows from the onset of communication with another MSC that the capability of responding to certain requests is not present in that exchange, it can choose other communications alternatives in a more efficient fashion. In addition, such knowledge of the capability to respond by a receiving exchange avoids loading the exchange processor with unnecessary actions which will terminate unsuccessfully thereby restricting the capacity of the processor, as well as avoid the needless occupation of valuable signalling resources on the data links between the respective MSC's.

In certain situations a cellular exchange may wish to treat the information received from a cooperating exchange as being unreliable. For example, some exchanges may include the capability of including within their location updating function an identification of whether the location updating arose as a result of a call access by the mobile or a registration by the mobile. When an exchange not having such a capability sends a location updating message to the home exchange of the mobile which does have such a function, an inclusion of the software package identification with that message, and thereby indicating an absence of that function in the sending exchange, gives the receiving home exchange the opportunity to further investigate the nature of the registration or take some other action based upon its understanding of the limitations in the capabilities of the visited exchange.

Inclusion of the software package and/or version information within the signalling information field of messages conforming to the protocol structured in accordance with the system of the present invention also may prove useful as a check to insure that the signals received from a cooperating exchange are valid. For example, an exchange with a specific software package should only send messages with a specific SIF field length. If however the actual length of the SIF field within a message received from a sending exchange does not correspond to the capabilities of the specific package identified in the message, the message may be assumed to be corrupt and/or incompatible and thus would not require any further processing by the receiving exchange.

Implementation of one embodiment of the system of the present invention includes the incorporation of two data bits into the SIF field of two of the messages included in the handshaking process between cooperating MSC's, the location updating message and routing enquiry message. These bits are designated as the "package information field" within the protocol of the message exchange signalling protocol. Correspondingly, the system also incorporates two bits into the SIF field of the acknowledging messages sent in response to the initial handshake origination messages, location updating accepted message and routing message. These data bits are also designated as package information within the SIF field included within the signalling protocol of the present invention. These two bits within the package information field are set according to an identification of the specific software packages and/or versions thereof and are recycled after an appropriate number of packages have been released to the market for inclusion within the software of MSC's. Of course, a field including a larger number of data bits could be incorporated in order to enhance the number of software packages and/or versions thereof which could be accommodated within the cellular exchanges of one or more networks.

Referring now to FIG. 2, there is shown a block diagram which depicts a standardized data format for the transfer of digital signalling information within the exchanges of a cellular network. The message signal unit 400 is composed of a series of sequentially arranged digital bits grouped into a plurality of fields of information. The overall format of a message signal unit begins with the transmission of a flag "F" 402 which has 8 bits. The flag is followed by backward sequence number "BSN" 404 which is 7 bits long. The BSN 404 field is followed by the backward indicator bit "BIB" 406 comprising 1 bit which is, in turn, followed by a forward sequence number "FSN" 408 comprising 7 bits of information. The FSN is followed by a forward indicator bit "FIB" 410 comprising 1 bit and then by a length indicator "LI" field 412 followed by a blank field comprising 2 bits 414. Field 414 is succeeded by the service information octet "SIO" 416 comprising 8 bits. Following the service information octet 416 is the signalling information field "SIF" 418 which carries information generated by the user comprising a plurality of groups of eight bits each with at least two groups will always be present depending on the purpose. The SIF 418 field is followed by a check bits field 420 comprising 16 bits which are in turn followed by a flag field 422 comprising 8 bits. The SIF field 418 is the block of information which the user is requested to define in order to effect appropriate signalling between exchanges.

Referring now to FIG. 3 there is illustrated a block diagram illustrating the general format of the signal information field 418 included within the message signal unit 400 shown in FIG. 2. The timing sequence of the digital data comprising the SIF field 418 begins with a label 450 which is a modified CCITT standard label having a destination point code, an origination point code, and a logical channel code as depicted in more detail in FIG. 4.

Continuing with FIG. 3, a heading code $H_0$ 452 comprising 4 bits is included next in the timing sequence of the SIF field 418. This heading code can be used to designate a variety of different functions including: location data forward messages; category/supplementary services forward messages; location data backward messages, category/supplementary services backward messages; routing information forward messages; routing information backward messages; data maintenance forward messages; and data maintenance backward messages. The heading consists of two parts, the heading code $H_0$ 452 and heading code H1 454. Heading code $H_0$ identifies a specific message group while heading code H1 either contains a signal code or in case of more complex messages, identifies the format of these messages. The heading code H1 is followed by an information field 456 comprising multiple group of eight bits each.

Referring now to FIG. 4, there is shown a block diagram of the SIF field label 450 which is comprised of three blocks: (a) destination point code "DPC" 458, which indicates the signalling destination for which the message is intended; (b) the originating point code "OPC" 460, which indicates the source of the message; and (c) the logical channel code "LOC" 462, which indicates a logical signalling channel identified by a transaction number allocated to the forward signal. The same LOC is also used for the related backward signal. The four least significant bits in the logical channel code are used for identifying one among several channels interconnecting an origination point and a destination point.

Referring next to FIG. 5, there is illustrated a block diagram of a data format within a digital bit stream for a message unit carrying a location updating message "MLUM". Label 468 is any one of a number of prefix bit streams as described in connection with FIGS. 3 and 4 and contains 40 bits. Heading code $H_0$ 470 is configured as described in FIG. 3 as is heading code H1 472. The number of digit signals field 474 contains 4 bits and is a pure binary representation of the number of digits, i.e., between 1 and 12, contained within the international mobile station identity number of the subscriber. The order code field 476 contains 2 bits and serves one of the following four functions: updates the subscriber's location and retrieves the subscriber's service categories; retrieves the subscriber's service categories; sets a temporary location for the subscriber; or clears a temporary location for the subscriber.

The package information field 478 contains 2 bits and is used to denote the particular software package being utilized in the MTSO which is sending the message, e.g., related to location updating as represented in the exemplary message of FIG. 5. Similarly, two bits correspondingly positioned within the SIF field of the acknowledgement message i.e., location updating accepted, are also identified as the package information field, as illustrated in FIG. 7. These bits can be selectively set according to the specific software package utilized in the exchanges and recycled after an appropriate number of packages have been created and used.

The international mobile station identity field 480 contains 48 bits and is used to denote the international identity number of the mobile station. The first indicator octet field 482 contains 8 bits while the serial number field 484 is a 32 bit code expressing in pure binary representation the electronic serial number of the mobile station. Spare field 486 is left open for future use.

Referring now to FIG. 6 there is shown a block diagram illustrating a data format 490 which is the basic structure of a location cancellation message (MLCM) used within cooperating exchanges of a cellular communications network. The label field 492 is as depicted in FIG. 4 while the heading code $H_0$ 494 field and heading code H1 field 496 are as depicted in FIG. 3. The number of digit signals field 498 and the international mobile station identity 499 field are as depicted in FIG. 5. By alteration of the codes used in these various fields the signalling system can achieve a number of different functions such as the conveyance of a location cancellation message, an activity message, or an inactivity message.

Referring now to FIG. 7 there is shown a block diagram illustrating a data format for digital bit streams which conveys a location updating accepted message which is one of several location data backward messages. Several different types of location data backward messages are included in the national mobile telephone user part protocol and are identified by different heading codes H1 556. The label field 552, heading code $H_0$ field 554, and heading code H1 field 556 are each configured as discussed above in connection with FIG. 3. The different location data backward messages include: a location updating accepted message; a location updating rejected message; a location cancellation accepted message; an activity accepted message; and an inactivity accepted message.

The categories/supplementary services field 558 is represented by a series of 32 bits which may indicate a variety of subscriber services. The first six bits identify the particular traffic class of the subscriber including ordinary calling subscriber, calling subscriber with priority, data call and coin box call. The next 2 bits of this field indicate the priority of the call including those of an ordinary subscriber, a normal priority (not during alarm state), a priority during alarm state and a spare priority state for future use. The next 4 bits of this field denote a subscriber controlled outgoing call barring function and include the capability of the barring of all outgoing calls, the barring of all outgoing international calls, the barring of all outgoing calls except local calls, the barring of all calls except outgoing international calls and the barring of all calls except trunk and international outgoing calls.

Still referring to FIG. 7, the next 2 bits of the categories/supplementary services field 558 are used for administration controlled outgoing call barring. Other bits within this field are used for services such as trunk offering, A-number transfer, call waiting, malicious call tracing, call transfer on no page response, call transfer on no answer, call transfer on busy, special dial tone, immediate service, and other functions.

The mobile station categories field 560 includes 32 bits and is used for the indication of such features as mobile priority, charge rate order, autonomous registration capability, portable mobile station, data transmission, test equipment, mobile voice privacy category values and subscription area category values. The number of digit signals field 562 contains 6 bits and is a pure binary representation of the number of digits, i.e., between 1 and 32, contained within the international mobile station directory number 566 of the subscriber.

The answer code field 564 represents a number of possible occurrences including: the subscriber's location updated and subscriber's service categories retrieved; subscriber's categories retrieved; temporary location set for the subscriber; and temporary location cleared for the subscriber. The directory number field 566 represents the directory number of the subscriber and is sent with the most significant digit first. The first indicator octet field 568 denotes whether a serial number is or is not included and indicates the presence of a second indicator octet. The serial number field 570 is a code expressing in pure binary representation the electronic serial number of the mobile station while the package information field 572 identifies the particular software package in use within the MSC as described above and requires 2 bits. The spare field 573 is reserved for future use.

Referring now to FIG. 8 there is illustrated a block diagram of a data format for a digital bit stream representing the location updating rejected message (MLUR) 574. The label field 576, heading code $H_0$ field 578 and heading code $H_1$ fields 580 are each as depicted in FIG. 7. The reason for rejection field 582 is an 8 bit message block which can denote, for example, roaming not allowed, unknown international mobile station number or an illegal serial number. Roaming may not be allowed, for example, because the software packages in each MTSO are not compatible and will not interface with one another.

Referring next to FIG. 9 there is illustrated a block diagram of a data format for a digital bit stream used for a routing inquiry message which is one of several information forward messages 610. The label field 612, heading code $H_1$ field 614 and heading code $H_0$ field 616 are as described above in connection with FIG. 3. The routing information forward messages are included in the national mobile telephone user part protocol and are each identified by a different heading code $H_1$. Routing information forward messages 610 is configured in the basic format of a routing inquiry message (MREM). The number of digit signals field 618 contains a code expressing in pure binary representation the number of digit signals contained within the directory number field 622. The package information field 620 contains a designation of the particular software package in use in the MTSO sending the message. The directory number field 622 is the same as that described above in connection with directory number field 566 of FIG. 7.

Referring now to FIG. 10, there is shown a block diagram of the data format of a digital bit stream used to convey routing message which is one of several information backward messages 658. The label field 660, heading code $H_0$ field 662 and heading code $H_1$ fields 664 are each configured as described above in connection with FIG. 3. The state field 666 comprises 4 bits and may denote an idle or busy state. The package information field 667 is used to denote the software package being utilized by the MTSO sending the message. The spare field 668 is reserved for future use. The routing information field 670 comprising 2 bits of data indicates whether the roaming number is included or not included within the message. An indication that the roaming number is not included means that the call shall be routed according to the dialed number, i.e., to the home MSC. An indication that the roaming number is included means that the call shall be routed using the roaming number, i.e., to the visited MSC. The number of digit signals field 672 expresses in pure binary representation the number of digit signals contained within the roaming number field 674 which is a designation comprising 128 bits which conveys the roaming number with the visited MSC and in which the most significant digit is sent first. Subsequent digits of the roaming number field are sent in successive 4 bit fields.

There are various possible signalling sequences which can be employed as examples of the use of the signals specified in the preceding figures. Mobile telephone signalling is designed to operate in a negotiating mode, thus, backward messages are supervised. If a backward message is not received within a given time, the forward message will be resent, up to three times. In cases where a call is waiting upon the execution of this signalling interchange, the backward message supervision period is shortened. If time out of the supervision period occurs without the receipt of a responsive backward message, the call controlling register indicates congestion and a logical channel is blocked for an additional period of time to receive a possible delayed backward message. Of course, in the normal case, timely acceptance signal is sent in the backward direction in response to the forward message. Set forth below in connection with FIGS. 11–17 are a series of signalling sequences some of which incorporate signals employing the signalling protocol structure of the present invention.

Referring now to FIG. 11 there is shown a signalling sequence 722 for representative messages sent between MSC's for location updating of a mobile. The visited MSC 724 sends a location updating message MLUM 726 to the home MSC 728. This is acknowledged by the home MSC by sending a location updating accepted message MLUA 728.

FIG. 12 shows a signalling sequence 730 where the location updating is rejected due to, for example, an incorrect serial number or an incompatible software package. The VMSC 732 sends a location updating message to HMSC 736 which in turn sends a location updating rejected message 738.

Referring now to FIG. 13 there is shown a signalling sequence 740 used to inform a VMSC that a mobile station has entered another MSC area. VMSC 742 receives a location cancellation message MLCM 744 sent from HMSC 746 after reception of an MULM from another MSC or in response to the mobile station returning to the home MSC. The VMSC 724 answers using the location cancellation accepted message MLUA 728.

Figure 14A:
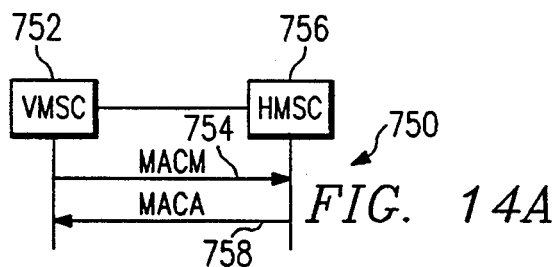
FIG. 14A is a block diagram of the signalling sequence used in a cellular communications network for an activity message.

FIG. 14A depicts a signalling sequence 750 used to inform a HMSC that the state of the mobile station is detected to be active after an inactive period. VMSC 752 sends an activity message MACM 754 to HMSC 756. The HMSC acknowledges the activity message by using an activity accepted message MACA 758.

Figure 14B:
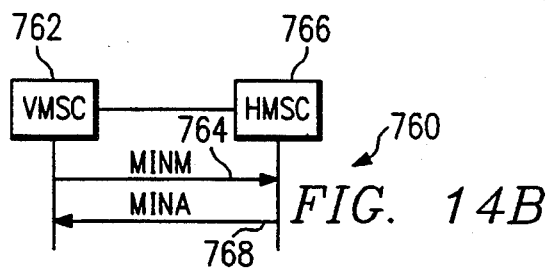
FIG. 14B is a block diagram of the signalling sequence used in a cellular communications network for inactivity message.

Referring now to FIG. 14B, there is depicted a signalling sequence 760 used to inform an HMSC that the state of the mobile station is detected to be inactive after an active period. VMSC 762 sends an inactivity message MINM 764 to HMSC 766. HMSC 766 acknowledges the inactivity message by using an inactivity accepted message MINA 768.

Figure 15A:
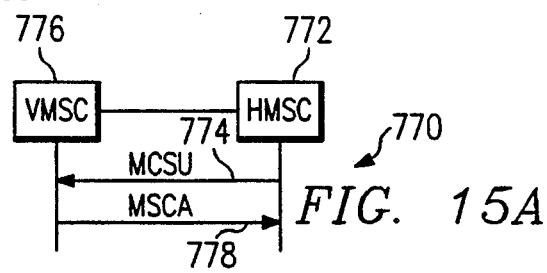
FIG. 15A is a block diagram of the signalling sequence used in a cellular communications network for a category/supplementary services updating message.

Referring next to FIG. 15A, there is depicted a signalling sequence 770 for the category/supplementary services information being changed from the HMSC to the VMSC. HMSC 772 sends a category/supplementary service updating message MCSU 774 which is acknowledged by VMSC 776 which in turn sends a category/supplementary services accepted message MCSA 778.

Figure 15B:
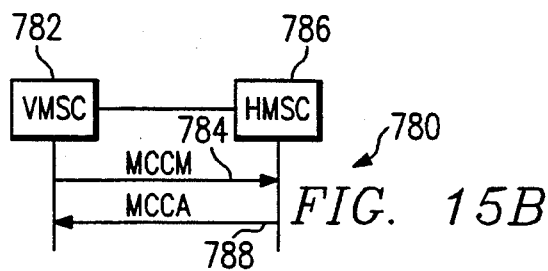
FIG. 15B is a block diagram of the signalling sequence used in a cellular communications network for code controlled subscriber service message accepted.

In FIG. 15B there is illustrated a signalling sequence 780 for category/supplementary services signalling where the subscriber service is activated or deactivated in the VMSC and requires data exchange with the HMSC. VMSC 782 sends a code control subscriber services message MCCM 784 to HMSC 786 which answers using, for example, a code controlled subscriber service message accepted MCCA 788.

Figure 15C:
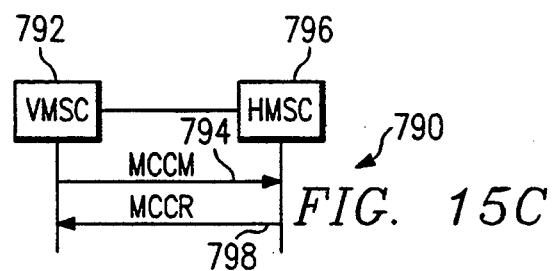
FIG. 15C is a block diagram of the signalling sequence used in a cellular communications network where the code controlled subscriber service is rejected.

Referring now to FIG. 15C there is shown a signalling sequence 790 where the code controlled subscriber service is rejected. VMSC 792 sends a code controlled subscriber service message MCCM 794 to HMSC 796 which, in turn, sends a code controlled subscriber service message rejected MCCR 798 back to the VMSC 792.

Figure 16A:
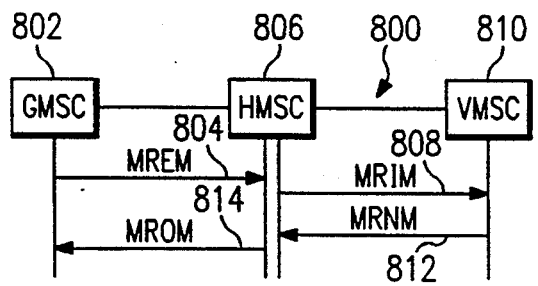
FIG. 16A is a block diagram of the signalling sequence used in a cellular communications network for routing information signalling used for determining the routing to be used for mobile station terminating calls.

FIG. 16A shows a signalling sequence 800 which is used for determining the routing to be used for mobile station terminating calls. A gateway GMSC 802 sends a routing inquiry message MREM 804 to the HMSC 806 and HMSC 806 in turn sends a roaming number interrogation message MRIM 808 to the VMSC 810. The VMSC 810 answers using a roaming number message MRNM 812 sent to the HMSC 806 which, in turn, sends a routing message MROM 814 to the GMSC 802.

Figure 16B:
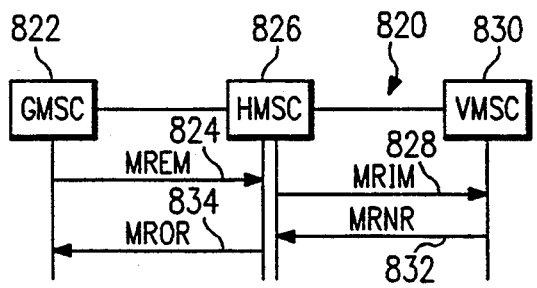
FIG. 16B is a block diagram of the signalling sequence used in a cellular communications network for sending a routing information signal.

Referring next to FIG. 16B there is depicted a signalling sequence 820 which shows a gateway MSC 822 sending a routing inquiry message MREM 824 to HMSC 826. HMSC 826, in turn, sends a roaming number interrogation message MRIM 828 to a VMSC 830 which answers using a roaming number rejected message MRNR 832 if the visitor register is congested. The HMSC 826 sends a routing rejected message MROR 834 to GMSC 822.

Figure 16C:
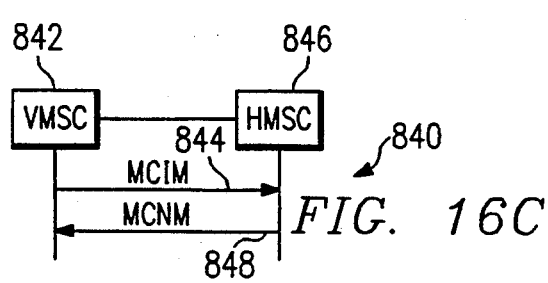
FIG. 16C is a block diagram of the signalling sequence used in a cellular communications network for a C-number interrogation signalling.

Referring now to FIG. 16C there is illustrated a normal C-number interrogation signalling sequence 840. The visited VMSC 842 sends a C-number interrogation message MCIM 844 to HMSC 846. This is acknowledged by HMSC 846 by sending a C-number message MCNM 848.

Figure 16D:
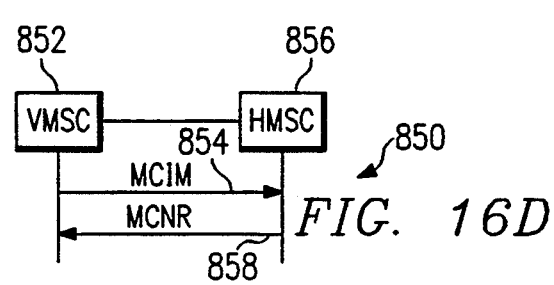
FIG. 16D is a block diagram of the signalling sequence used in a cellular communications network for a C-number interrogation signalling rejected.

FIG. 16D shows a signalling sequence 850 representing a sequence where the HMSC sends the C-number rejected message as an acknowledgement to the C-number interrogation message which occurs if the C-number has not been found. In such a sequence VMSC 852 sends a C-number interrogation message MCIM 854 to HMSC 856. If the C-number cannot be found, HMSC 856 sends a C-number rejected message MCNR 858 to VMSC 8521.

Figure 17A:
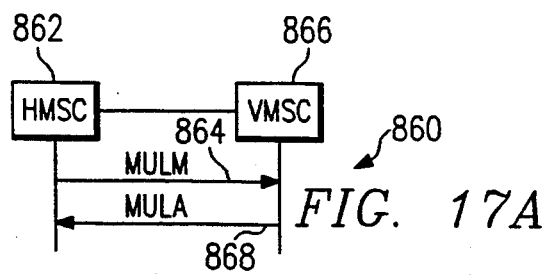
FIG. 17A is a block diagram of the signalling sequence used in a cellular communications network to inform a VMSC about unreliable location data.

Referring next to FIG. 17A there is illustrated a signalling sequence 860 for the transmission of data maintenance messages for maintaining data of cooperating exchanges. Signalling sequence 860 depicts a sequence of information exchange used to inform a VMSC about unreliable location data. HMSC 862 sends an unreliable location data detected message MULM 864 to a VMSC 866. This is acknowledged by VMSC 866 which sends an unreliable location data detected acknowledgement message MULA 868 to the HMSC 862.

Figure 17B:
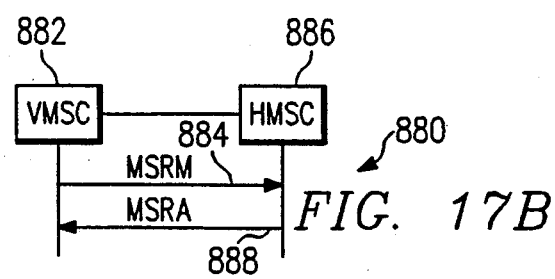
FIG. 17B is a block diagram of the signalling sequence used in a cellular communications network to inform an HMSC about system restart information.

Referring finally to FIG. 17B there is shown a signalling sequence 880 used to inform an HMSC about system restart information. The VMSC 882 sends a system restart information message MSRM 884 to HMSC 886. This is acknowledged by HMSC 886 which sends a system restart information acknowledgement message MSRA 888 to VMSC 882.

As can be seen from the above description, the exchange of messages between cooperating exchanges comprising a cellular radio telecommunications network is essential to the implementation of subscriber features such as automatic roaming as message exchange also requires a great deal of processing time on the part of the exchanges and circuit time on the data links between exchanges. Thee efficiency of functional interaction between cooperating exchanges is greatly enhanced by the incorporation of the signalling protocol configured in accordance with the present invention. The inclusion of a data field within the signalling information field of the initial handshake messages between MSC's to identify the particular software packages and/or versions thereof in use by the respective MSC's sending those messages results in a greatly improved communication between the exchanges. Such a feature of the system of the present invention is especially useful in view of the variation of features available in the different exchanges a subscriber encounters as it roams over a wide geographic area as well as the rapid proliferation of subscriber features which are being incorporated into the software controlling such exchanges. An exchange of the software package information at the initial handshake stages of communication between two exchanges quickly informs one of the others features and capabilities and allows an immediate recognition of any modifications of the message exchange procedures which may be necessary in order to attain the highest level of efficiency of interaction between the two exchanges.

While it is believed that the operation and construction of the system of the present invention will be apparent from the foregoing description, the method of operation and structure of the system shown and described has been characterized as being preferred and obvious changes and modifications may be made therein without departing of the spirit and scope of the invention as defined in the following claims.

What is claimed is:

1. A method of transmitting data packets in a data network connecting a plurality of mobile switching centers in a cellular radio telecommunications network providing service to a plurality of subscribers, each of said mobile switching centers containing a software package, said method comprising the steps of:

inserting into each packet a label containing an identification of a source mobile switching center and a destination mobile switching center for the packet;

inserting into said packet an information block including a message containing subscriber service data;

inserting into said packet data identifying the software package in said source mobile switching center; and sending said packet from said source mobile switching center to said destination mobile switching center.

2. A method of transmitting data packets in a data network as set forth in claim 1 in which said step of inserting data identifying said source software package comprises the step of:

inserting said software package identification data into said information block.

3. A method of transmitting data packets in a data network as set forth in claim 1 in which said message is a request message.

4. A method of transmitting data packets in a data network as set forth in claim 3 further comprising the step of:

responding to said request message with a data packet containing a reply message sent from said destination mobile switching center to said source mobile switching center, the length of which being a function of the identity of the software package in said destination mobile switching center.

5. A method of transmitting data packets in a data network as set forth in claim 4 further comprising the step of:
inserting within said packet containing the reply message data identifying the software package in said destination mobile switching center.

6. A method of transmitting data packets in a data network as set forth in claim 5 in which said request and reply messages are part of a handshaking procedure between said source and said destination mobile switching centers preparatory to the exchange of additional messages therebetween.

7. A signalling system for communicating messages via a communications medium between an originating mobile switching center and at least one destination mobile switching center within a cellular radio telecommunications network providing service to a plurality of subscribers, each of said mobile switching centers including a software package, each of said messages relating to the cellular service being provided to one of said subscribers and comprising:
a label field containing an identification of said originating mobile switching center and said at least one destination mobile switching center;
a pair of heading codes fields; and
an information field including:
a package information block which identifies the software package within said originating mobile switching center.

8. A signalling system for communicating messages via a communications medium between an originating mobile switching center and at least one destination mobile switching center as set forth in claim 7 in which said information field further includes:
a first block of data containing an electronic serial number of a mobile station being used by said one subscriber;
a second block of data containing a multi-digit number associated with said one subscriber; and
a third block of data specifying the number of digits in said multi-digit number.

9. A signalling system for communicating messages via a communications medium between an originating mobile switching center and at least one destination mobile switching center as set forth in claim 8 in which:
said multi-digit number contained within said second block of data is the international mobile station identity number of said one subscriber.

10. A signalling system for communicating messages via a communications medium between an originating mobile switching center and at least one destination mobile switching center as set forth in claim 8 in which:
said multi-digit number contained within the second block of data is the directory number of said one subscriber.

11. A signalling system for communicating messages via a communications medium between an originating mobile switching center and at least one destination mobile switching center as set forth in claim 7 in which:
said messages are part of a handshaking procedure between said mobile switching centers preparatory to the exchange of additional messages therebetween.

12. A signalling system for communicating messages via a communications medium between an originating mobile switching center and at least one destination mobile switching center as set forth in claim 7 in which:
said messages relate to providing automatic roaming service to said subscribers within said cellular network.

13. A signalling system for communicating messages via a communications medium between an originating mobile switching center and at least one destination mobile switching center as set forth in claim 12 in which:
each of said messages is either a location update message or a location update accepted message.

14. In a cellular radiotelephone system network carrying high speed digital messages between a plurality of mobile switching centers serving mobile subscribers located in different geographic areas within said network, the combination of:
a first mobile switching center including a software package having a particular identity which provides to said center certain specific features and communications capabilities;
a second mobile switching center connected to said first center for the communication of data therebetween, said second center also including a software package having a particular identity which provides to said second center certain specific features and communications capabilities; and
a signalling system for carrying digital data messages between said first and second mobile switching centers related to the providing of mobile communications services to said subscribers, said signalling system incorporating a communications protocol including:
a data packet label comprising an identification of a source switching center and a destination switching center;
an information block including a message being sent from said source center to said destination center; and
means for identifying the particular software package within said source center from which said message originates.

15. In a cellular radiotelephone system network carrying high speed digital messages between a plurality of mobile switching centers serving mobile subscribers located in different geographic areas within said network, the combination set forth in claim 14 wherein said software package identification means is included within said information block.

16. In a cellular radiotelephone system network carrying high speed digital messages between a plurality of mobile switching centers serving mobile subscribers located in different geographic areas within said network, the combination set forth in claim 14 in which:
said message within said information block relates to providing automatic roaming service to a mobile station within said cellular network.

17. In a cellular radiotelephone system network carrying high speed digital messages between a plurality of mobile switching centers serving mobile subscribers located in different geographic areas within said network, the combination set forth in claim 16 in which:
said message is part of a handshaking procedure between said first and second mobile switching centers preparatory to the exchange of additional messages therebetween.

18. In a cellular radiotelephone system network carrying high speed digital messages between a plurality of mobile switching centers serving mobile subscribers located in different geographic areas within said network, the combination set forth in claim 17 in which
said message is either a location update message or a location update message accepted message.

19. In a cellular radiotelephone system network carrying high speed digital messages between a plurality of mobile switching centers serving mobile subscribers located in different geographic areas within said network, the combination set forth in claim 18 in which:
said protocol forms part of a signal sent within the mobile telephone user part of the C.C.I.T.T. No. 7 signalling protocol.

20. A system for transmitting data packets in a data network connecting a plurality of mobile switching centers in a cellular radio telecommunications network providing service to a plurality of subscribers, each of said mobile switching centers including a software package, said system comprising:
means for inserting into each packet a label containing an identification of a source mobile switching center and a destination mobile switching center for the packet;
means for inserting into said packet an information block including a message containing subscriber service data;
means for inserting into said packet data identifying the software package in said source mobile switching center; and
means for sending said packet from said source mobile switching center to said destination mobile switching center.

21. A system for transmitting data packets in a data network as set forth in claim 20 in which said means for inserting an identification of data identifying said source software package comprises:
means for inserting said software package identification data into said information block.

22. A system for transmitting data packets in a data network as set forth in claim 20 in which said message is a request message.

23. A system for transmitting data packets in a data network as set forth in claim 22 further comprising:
means for responding to said request message with a data packet containing a reply message sent from said destination mobile switching center to said source mobile switching center, the length of which being a function of the identity of the software package in said destination mobile switching center.

24. A system for transmitting data packets in a data network as set forth in claim 23 further comprising:
means for inserting within said packet containing the reply message data identifying the software package in said destination mobile switching center.

25. A system for transmitting data packets in a data network as set forth in claim 24 in which said request and reply messages are part of a handshaking procedure between said source and said destination mobile switching centers preparatory to the exchange of additional messages therebetween.

26. In a cellular network comprised of first and second exchanges, each of said first and second exchanges including a software package for providing services to a plurality of subscribers, a method for controlling the exchange of subscriber service information between said first and second exchanges comprising the steps of:
sending from said first exchange to said second exchange a handshake origination message including an identification of the software package in said first exchange;
sending from said second exchange to said first exchange, in response to the receipt of said handshake origination message, a handshake confirmation message including an identification of the software package in said second exchange; and
exchanging subscriber service information between said first and second exchanges based on the capabilities of said software packages in said first and second exchanges, respectively.

27. The method of claim 26 wherein said first exchange is a visited exchange to which a subscriber has roamed, said second exchange is a home exchange of said subscriber, said handshake origination message comprises a location update message and said handshake confirmation message comprises a location update accepted message.

28. The method of claim 26 wherein said first exchange is a gateway exchange which receives a call to be routed to a subscriber, said second exchange is the home exchange of said subscriber, said handshake origination message comprises a routing inquiry message and said handshake confirmation message comprises a routing response message.

29. The method of claim 26 wherein each of said handshake messages is contained in a signalling information field (SIF) of a signalling message formatted in accordance with C.C.I.T.T. No. 7 signalling protocol.

30. The method of claim 29 wherein the length of said SIF is a function of the capabilities of the software package identified therein.

* * * * *

UNITED STATES PATENT AND TRADEMARK OFFICE
CERTIFICATE OF CORRECTION

PATENT NO. : 5,408,419
DATED : April 18, 1995
INVENTOR(S) : Chi Wong

It is certified that error appears in the above-indentified patent and that said Letters Patent is hereby corrected as shown below:

Column 11, line 1        Replace "$H_0$"
                         With --HO--

Column 11, line 12       Replace "$H_0$"
                         With --HO--

Column 11, line 13       Replace "$H_0$"
                         With --HO--

Column 11, line 38       Replace "$H_0$"
                         With --HO--

Column 12, line 6        Replace "$H_0$"
                         With --HO--

Column 12, line 22       Replace "$H_0$"
                         With --HO--

Column 13, line 17       Replace "$H_0$"
                         With --HO--

Column 13, line 30       Replace "$H_0$"
                         With --HO--

UNITED STATES PATENT AND TRADEMARK OFFICE
CERTIFICATE OF CORRECTION

PATENT NO. : 5,408,419
DATED : April 18, 1995
INVENTOR(S) : Chi Wong

It is certified that error appears in the above-indentified patent and that said Letters Patent is hereby corrected as shown below:

Column 13, line 49          Replace "$H_0$"
                                      With --H0--

Column 16, line 3           Replace "Thee"
                                      With --The--

Column 17, line 28          Replace "codes"
                                      With --code--

Signed and Sealed this

Twenty-fourth Day of September, 1996

Attest:

BRUCE LEHMAN

*Attesting Officer*          *Commissioner of Patents and Trademarks*